No. 780,753.  Patented January 24, 1905.

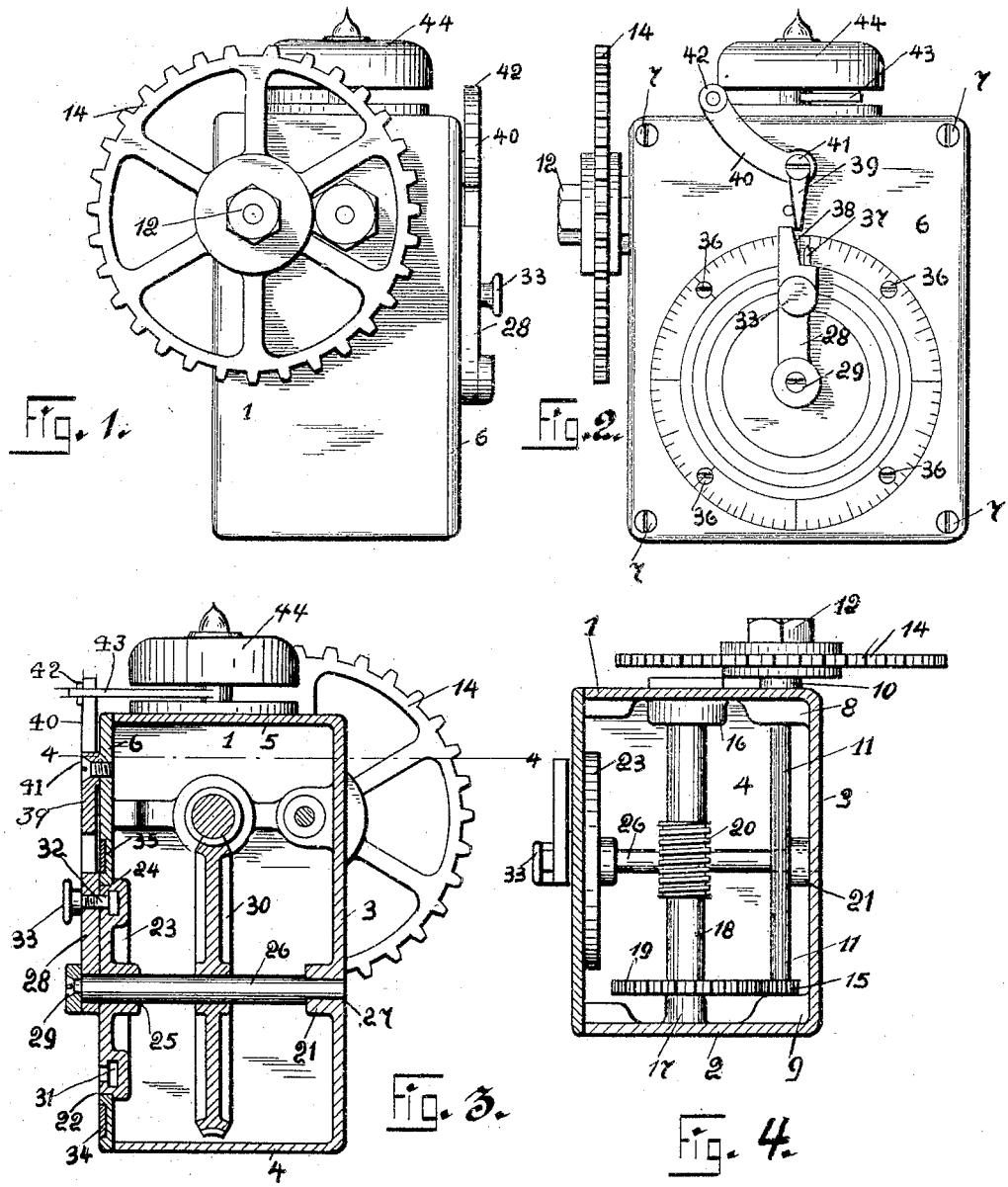

UNITED STATES PATENT OFFICE.

CHARLES HOLOWELL, OF PITTSBURG, PENNSYLVANIA.

INDICATOR FOR BREAD-MIXING MACHINES.

SPECIFICATION forming part of Letters Patent No. 780,753, dated January 24, 1905.

Application filed June 30, 1904. Serial No. 214,792.

*To all whom it may concern:*

Be it known that I, CHARLES HOLOWELL, a citizen of the United States of America, residing at Pittsburg, in the county of Allegheny and State of Pennsylvania, have invented certain new and useful Improvements in Indicators for Bread-Mixing Machines, of which the following is a specification, reference being had therein to the accompanying drawings.

This invention has relation to indicators, and more particularly to an indicator adapted to be used upon bread-making machines to determine when the bread has been sufficiently mixed; and the invention has for its object to provide an indicator of this character which may be readily attached to a bread-mixing machine and operated from the power-shaft of said machine.

Another object of my invention is to provide novel means in conjunction with the indicator whereby an alarm will be sounded when the operating-shaft of the bread-mixing machine will have revolved a predetermined number of times; and the invention further resides in constructing an indicator of the above-described character which will be extremely simple in construction, strong and durable, and comparatively inexpensive to manufacture.

To ameliorate the character of indicators commonly used, I reconstruct the indicators upon entirely different lines. It is a well-known fact that indicators have been employed to register the number of revolutions a shaft or wheel revolves, and I intend to construct an indicator which may be used in connection with bread-mixing machines, the indicator being employed to sound an alarm after the main operating-shaft of the bread-mixer has revolved a predetermined number of times. In machines of this character it is essential that the dough be properly mixed to a certain consistency to obtain the best results, and I have provided novel means to signify when the bread or dough has been thoroughly mixed or agitated, also novel means in connection with the indicator whereby the same may be set to notify the attendant or manipulator of the bread-mixing machine when a predetermined number of revolutions have been performed by the mixers or agitators of the machine.

Briefly described, the indicator comprises a casing in which is mounted a shaft that protrudes through the casing and has mounted on its protruding end a sprocket-wheel which is adapted to be connected to the main operating-shaft of the bread-mixing machine. The shaft mounted in the casing is suitably geared to another shaft having a worm formed thereon, and this worm imparts motion to the dial-shaft, which carries a large pinion meshing with the worm. The dial-shaft is provided with an indicating-hand which rotates around a suitable dial secured in one of the walls of the casing, and upon this wall of the casing I provide a clapper, with which the hand is adapted to contact and cause the clapper to strike a bell mounted upon the top of the casing to sound an alarm when the main operating-shaft of the bread-mixing machine has revolved a predetermined number of revolutions.

The above construction will be hereinafter more fully described and specifically pointed out in the claims.

Referring to the drawings accompanying this application Figure 1 is an end elevation of my improved indicator. Fig. 2 is a front elevation of the same. Fig. 3 is a vertical sectional view of my improved indicator, and Fig. 4 is a transverse sectional view taken on the line 4 4 of Fig. 3.

Throughout the several views of the accompanying drawings like numerals of reference indicate similar parts, and the reference-numerals 1 and 2 indicate the end walls of the casing, which are formed integral with the rear wall 3 and the top and bottom walls 4 and 5, forming a receptacle in which the operating mechanism of my improved indicator is mounted.

The reference-numeral 6 indicates the front wall or lid of the receptacle, which is secured upon the end walls and the top and bottom walls of the receptacle by screws 7 7.

The end walls 1 and 2 of the casing are formed with bosses 8 and 9, preferably near the top wall 5 of the casing, and in the boss 8 and the end wall 1 of the casing is formed an aperture in which is secured a screw-threaded bushing 10, and journaled in this bushing and the boss 9 is a shaft 11, which protrudes beyond the bushing and has secured upon its outer end by a nut 12 a sprocket-wheel 14, and upon the shaft 11, adjacent to the boss 9, is mounted a pinion 15. In alinement with the bosses 8 and 9 are formed bosses 16 and 17 upon the end walls 1 and 2 of the casing, and in these bosses is journaled a shaft 18, upon which is mounted a gear-wheel 19, which is adapted to mesh with the pinion 15 of the shaft 11.

The reference-numeral 20 indicates a worm which is formed integral with said shaft and is located centrally of the length of the shaft. The rear wall 3 of the casing is formed with a boss 21 and the front wall 6 of the casing is provided with an annular opening 22, and in this opening is mounted a disk 23, which is flanged, as indicated at 24, to engage the inner sides of the annular opening 22, and the disk is provided with a central aperture 25, through which a dial-shaft 26 passes, the rear end of this shaft being contracted, as indicated at 27, and journaled in the boss 21 of the rear wall 3. The disk 23 is secured to the shaft 26 by any suitable means and is provided upon its outer end with a hand 28, that is secured thereon by a screw 29. The reference-numeral 30 indicates worm-wheel, which is mounted centrally upon the shaft 26 and is adapted to mesh with the worm 20 of the shaft 18.

The disk 23 has formed in its outer face an annular T-shaped groove 31, and the hand 28 is provided with a T-shaped bolt 32, which is adapted to engage within said groove and be secured therein in any desired position by a thumb-nut 33, which is mounted upon the screw-threaded shank of the T-shaped bolt. The front wall of the casing is provided with a graduated annular ring 34, that is countersunk in an annular groove 35, formed in the front wall of the casing, and the ring is secured in said groove by screws 36 36 and surrounds the disk 23, as clearly shown in Fig. 2 of the drawings. The hand 28 is provided with a pointer 37, which is adapted to lie in a plane with the graduated ring and indicate at times the number of degrees which the hand has revolved. The hand extends upwardly a short distance and is provided with a beveled surface 38, this upwardly-extending end being adapted to strike a depending lug 39, formed integral with the arm 40, which is pivotally mounted by a screw 41 upon the front wall of the casing directly above the dial. The arm 40 is provided with an outwardly-extending lug 42, which when actuated is adapted to strike the clapper 43 of the bell 44 that is mounted upon the top wall 5 of the casing.

The operation of my improved indicator is as follows: Upon motion being imparted to the sprocket-wheel 14 the shaft 11 rotates, imparting a similar movement to the shaft 18 through the medium of the pinion 15 and gear 19 mounted upon said shafts, and a rotary motion is imparted to the dial-shaft 26 by the worm-wheel 30 meshing with the worm 20 of the shaft 18. When the shaft 26 revolves, it carries around with it the disk 23 and the hand 28, this hand revolving in front of the dial or graduated ring 34, and upon every revolution of the hand it is adapted to strike the downwardly-extending lugs 39 and cause the arm 40 to strike the clapper and sound an alarm. The hand 28 is adjustably mounted upon the disk 23, whereby the position of the hand upon the disk may be regulated to conform with the requirements necessary in operating the indicator, this hand being set in such a manner as when the disk 23 has revolved a predetermined distance or number of degrees it will strike the lug 39 and sound an alarm, this alarm, as heretofore stated, being used to notify the manipulator of the machine that the bread-dough has been mixed sufficiently or to a certain consistency.

It will be noted that the indicator may be geared or otherwise connected to the bread-mixing machine to facilitate the operation of the indicator, the sprocket-wheel being shown in only one manner in which the indicator may be operated from the main operating-shaft of the bread-mixing machine, this form being shown on account of the convenience of locating the indicator in any desired place adjacent to the machine, operating the same by a sprocket-chain (not shown) connected to the sprocket-wheel 14 and the main operating-shaft of the bread-mixing machine. (Not shown.) It will also be observed that the gearing of the different shafts mounted within the casing may be changed to govern the rapidity at which the disk and hand are revolved around the graduated ring or dial, gearing being employed to accomplish the desired results that are to be obtained in thoroughly mixing and agitating the dough within the bread-mixing machine.

What I claim is—

1. In an indicator, a casing carrying a bell, a drive-shaft journaled in the walls of the casing, a pinion mounted on said shaft, a worm-shaft journaled in the walls of the casing, a gear carried by said shaft and meshing with the pinion, a dial-shaft journaled at one end in the wall of the casing, a disk mounted on said dial-shaft and revolving in an opening provided therefor in the front wall of the casing, a stationary graduated ring surrounding said disk, a hand mounted on the outer end of the dial-shaft and adjustably connected to the disk, a worm-wheel on the dial-shaft engaging the worm-shaft, and means actuated by the hand in its movement to sound the bell, substantially as described.

2. In an indicator, a casing carrying a bell, a drive-shaft journaled in the casing, a pinion carried by the drive-shaft, a worm-shaft journaled in the casing, a gear thereon meshing with the pinion on the drive-shaft, a dial-shaft journaled at its one end in one wall of the casing, a worm-wheel on said dial-shaft meshing with the worm-shaft, a disk carried by the dial-shaft to revolve in an opening provided therefor in the front wall of the casing, a pointer carried by the dial-shaft and connected to said disk, a graduated ring or dial countersunk in the front plate and surrounding the disk on the dial-shaft, and means actuated by the hand in its movement for sounding the bell, substantially as described.

3. In an indicator, a casing, a dial-shaft journaled therein, a disk carried by the shaft to revolve in an opening provided therefor in the casing, a hand carried by the shaft, a bolt passed through the hand and having its head received in a circumferential groove in the disk, means for driving the dial-shaft, and means operated by the hand in its travel to sound an alarm, substantially as described.

4. In an indicator, a casing, a dial-shaft journaled therein, means for driving the shaft, a disk carried by the shaft and adapted to revolve in an opening provided therefor in the front of the casing, said disk having a circumferential groove of substantially T shape in cross-section, a bolt having a T-shaped head received in said groove, a hand mounted on the dial-shaft and pierced by said bolt, a nut on the bolt for securing the hand to the disk, and means operated by the hand in its travel to sound an alarm, substantially as described.

In testimony whereof I affix my signature in the presence of two witnesses.

CHARLES HOLOWELL.

Witnesses:
 E. E. POTTER,
 K. H. BUTLER.